United States Patent
Giblin et al.

(10) Patent No.: US 10,380,157 B2
(45) Date of Patent: Aug. 13, 2019

(54) RANKING PROXIMITY OF DATA SOURCES WITH AUTHORITATIVE ENTITIES IN SOCIAL NETWORKS

(71) Applicant: International Business Machines Corporation, Armonk, NY (US)

(72) Inventors: Christopher J. Giblin, Zurich (CH); John G. Rooney, Zurich (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 635 days.

(21) Appl. No.: 15/146,554

(22) Filed: May 4, 2016

(65) Prior Publication Data

US 2017/0322941 A1 Nov. 9, 2017

(51) Int. Cl.
*G06F 16/33* (2019.01)

(52) U.S. Cl.
CPC ................ *G06F 16/3347* (2019.01)

(58) Field of Classification Search
CPC ............. G06F 17/30516; G06F 16/3347
USPC ..................................................... 707/730
See application file for complete search history.

(56) References Cited

U.S. PATENT DOCUMENTS

| 6,473,753 B1* | 10/2002 | Katariya | G06F 17/277 |
| | | | 704/10 |
| 7,188,117 B2 | 3/2007 | Farahat et al. | |
| 8,260,789 B2 | 9/2012 | Dumais et al. | |
| 8,666,990 B2 | 3/2014 | Wu | |
| 2009/0070325 A1* | 3/2009 | Gabriel | G06F 16/338 |
| | | | 707/999.005 |
| 2011/0106807 A1* | 5/2011 | Srihari | G06F 16/288 |
| | | | 707/739 |
| 2013/0218644 A1 | 8/2013 | Kasravi et al. | |

* cited by examiner

*Primary Examiner* — Pierre M Vital
*Assistant Examiner* — Andrew N Ho
(74) *Attorney, Agent, or Firm* — Cantor Colburn LLP; Daniel Morris

(57) ABSTRACT

Embodiments are directed to a computer-implemented method for ranking a proximity of data sources with one or more reference entities, which may be authoritative entities. The method comprises identifying several data sources and one or more reference entities. For each of the identified reference entities a vector of terms representative of said each of the reference entities is obtained. For each data source of the identified data sources, terms from said each data source are selected, an array comprising the selected terms can be accordingly populated, and a term frequency of terms of the vector obtained for said each of the reference entities is determined, in said array. The term frequency corresponds to the number of occurrences of said each of the terms in said array. The method ranks a proximity of the identified data sources with each of the one or more reference entities.

17 Claims, 5 Drawing Sheets

RANKING PROXIMITY OF DATA SOURCES WITH AUTHORITATIVE ENTITIES IN SOCIAL NETWORKS

BACKGROUND

The invention relates in general to the fields of digital data mining and information retrieval, and more specifically to digital data mining and information retrieval in the context of social media.

SUMMARY

According to one aspect, the present invention is embodied as a computer-implemented method for ranking a proximity of data sources with one or more reference entities (e.g., authoritative entities). The method starts with identifying several data sources and one or more reference entities. For each of the identified reference entities, a vector of terms representative of said each of the reference entities is obtained. For each data source of the identified data sources, terms from said each data source are selected, an array comprising the selected terms can be accordingly populated, and a term frequency of terms of the vector obtained for said each of the reference entities is determined, in said array. The term frequency corresponds to the number of occurrences of said each of the terms in said array. Finally, the method ranks a proximity of the identified data sources with each of the one or more reference entities, according to the term frequencies as determined for all the terms of the vector obtained for each of the reference entities.

In embodiments, present methods further determine a measure of information as provided by terms in the vectors obtained for the reference entities. Thus, each term frequency as determined for each data source can be weighted by the measure of information as determined for a term corresponding to a term for which said each term frequency was determined, to obtain a weighted term frequency for this term. This way, the ranking is performed according to the weighted term frequencies as determined for all of the terms of the vector obtained for said each of the reference entities.

In one or more embodiments, said measure of information is determined, for each term, as an inverse document frequency, based on: a total number of arrays as determined for all the identified data sources; and a number of arrays that comprise said each term.

According to another aspect, the invention is embodied as a computerized system for ranking a proximity of data sources with one or more reference entities. The system comprises a memory, storing computerized methods and identifiers of several data sources and one or more reference entities, and one or more processing elements. The computerized methods are designed, when executed by said one or more processing elements, to implement steps such as described above.

According to another aspect, the invention is embodied as a computer-program product comprising a computer readable storage medium having program instructions embodied therewith, the program instructions being executable by one or more processing elements to cause the latter to implement steps as described above.

Computerized systems, methods, and computer program products embodying the present invention will now be described, by way of non-limiting examples, and in reference to the accompanying drawings.

BRIEF DESCRIPTION OF SEVERAL VIEWS OF THE DRAWINGS

The accompanying drawings show simplified representations of computerized systems or parts thereof, as involved in embodiments. Similar or functionally similar elements in the figures have been allocated the same numeral references, unless otherwise indicated.

DETAILED DESCRIPTION

Figure 1:
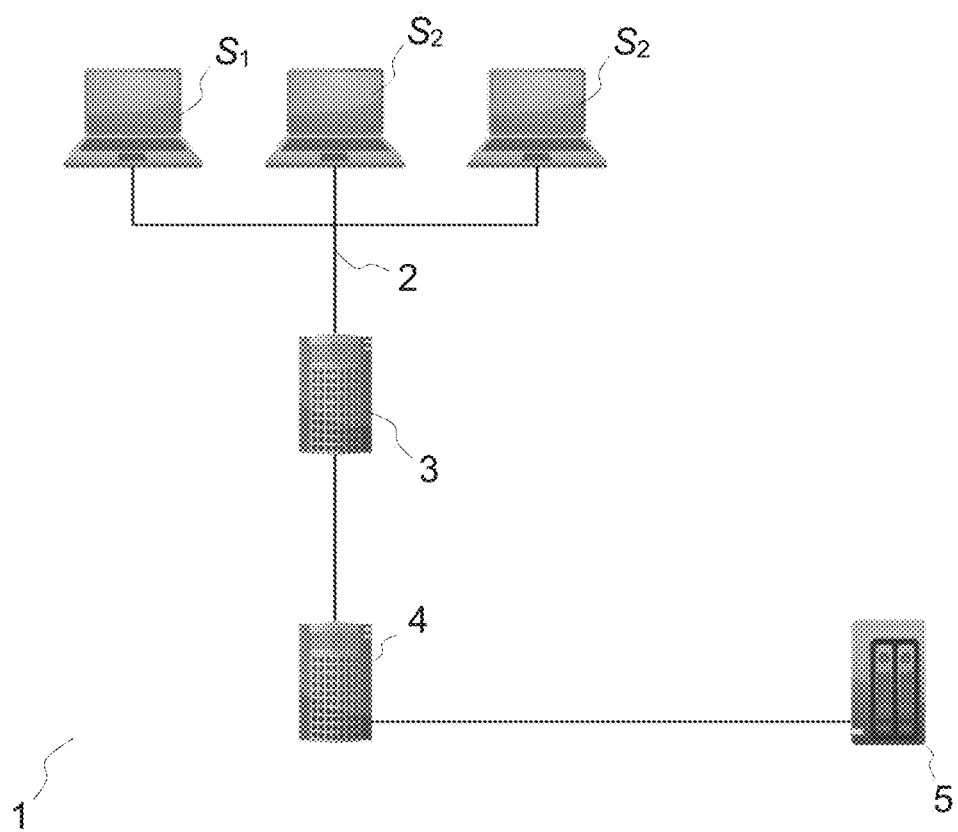
FIG. 1 schematically represents data sources interacting with a server supporting in a telecommunication network to form a social network, as involved in embodiments of the invention.

Social media and, more generally, the Internet, often raise issues related to actual sources of data. For example, most companies (above a certain critical size) have one or more accounts on various social networks. These accounts provide useful information about the company, of use to analysts, marketeers and sales representatives. However, as the accounts may have been added over time by different parts of the organization, or after acquisitions of news companies, there is typically no single location at which to determine the complete set of relevant accounts. Moreover, individuals (affiliated or not with the company) may also acts as sources of information, although the accounts are not visibly associated with the company. For example a senior manager may make announcements about their company, from their private account.

Here, a distinction should be made between pertinent information about a company, e.g. information that is useful and relevant information about the company's business, and authoritative information, which is likely to be from the company or associated parties.

A problem addressed by the present disclosure is the following: given a large number of data sources and a smaller number of organizations, how to map one to the other, so as to be able to rank the data sources with a certain degree of association with the organizations. This problem is distinct from that used in stylometry, for a number of reasons. First, all data sources will have some degree of association with a given, reference source such as an authoritative source or authoritative entity. Thus, a meaningful solution should seek to rank a proximity of such data sources with said entity, rather than identify them. Second, if data sources are 'open' and can easily be replicated by third parties (e.g., 'bots' that copy and transmit the information), then the solution should account for this noise. Third, as data sources may be in multiple languages, the solution should be language neutral; specific languages are preferred only to the extent that such languages are important for the companies' business.

In the following, solutions are disclosed that address one or more of the above issues. The following description is structured as follows. First, general embodiments and high-level variants are described followed by more specific embodiments and technical implementation details.

In reference to FIGS. 1-5, an aspect of the invention is first described, which concerns methods for ranking proximity of data sources $S_i$ with one or more reference entities $E_j$. Reference entities are typically authoritative entities, as assumed in the following description, for the sake of exemplification. However, as it will be apparent to the one skilled in the art, the present methods may be implemented in view of ranking a proximity of data sources with any reference entity. Data sources are entities that produce data, e.g., by way of messages sent or broadcasted, and may be affiliated with one or more of the authoritative entities, or not. Authoritative entities may be organizations, companies, or organizations linked to companies, etc. Authoritative entities may comprise or involve data sources, producing data (in their names, or not).

Basically, such methods first comprise identifying S10, S20 (FIG. 2) one or more authoritative entities $E_j$ and several data sources $S_i$. For each of the identified authoritative entities $E_j$, a vector $v_j$ of terms w representative of each authoritative entity $E_j$ is obtained S12, e.g., from web sites of the entities, as discussed later in detail. Terms w from each data source $S_i$ are selected S23, e.g., based on messages sent or broadcasted from such sources, and an array $\alpha_i$ is (subsequently or concomitantly) populated S24, which comprises such selected terms.

Figure 2:
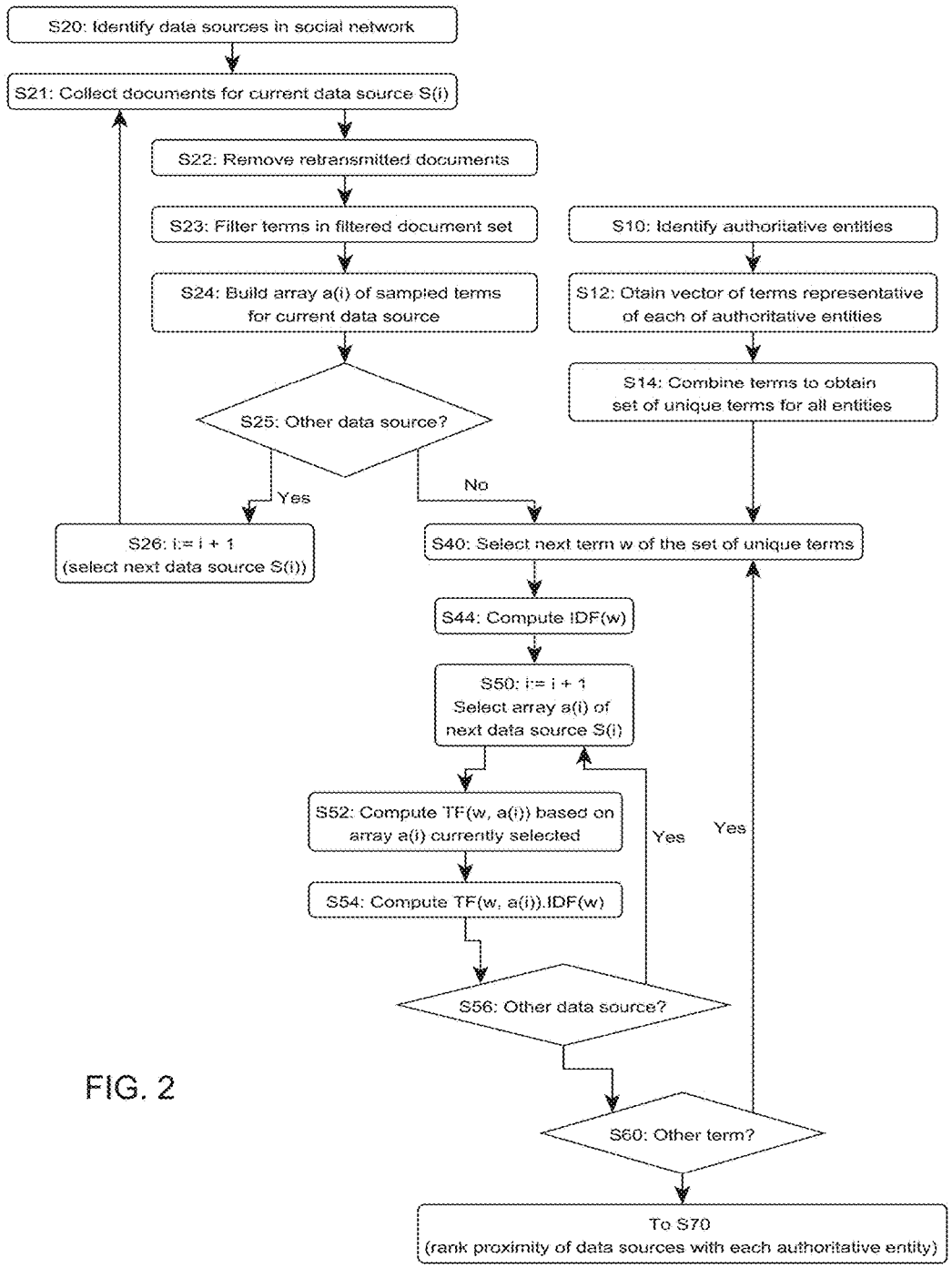
FIG. 2 is a flowchart illustrating high-level steps of a ranking method, according to embodiments.

Steps S21-S24 and steps S10-S14 may be performed independently, as illustrated in FIG. 2. I.e., terms w can be selected and the array $a_i$ corresponding to source $S_i$ populated prior to computing vectors $v_j$ for entities $E_j$. However, such terms need typically be constantly updated, while the vectors $v_j$ are typically less often updated.

Once an array corresponding to a given source $S_i$ has been populated, a term frequency TF(w, $\alpha_i$) can be determined S52. This operation is performed for each data source $S_i$ and for all terms w of the vector $v_j$, as obtained for each authoritative entity $E_j$, subject to the comments below. That is, the term frequency corresponds to the number of occurrences, in said array $\alpha_i$ of a given term of the vector $v_j$, as illustrated later herein by way of examples.

Yet, as one may realize, not all the terms w of each of the vectors $v_j$ may effectively need be compared at step S52, since there will probably be some overlap of terms, from one vector to the other. Therefore, an additional vector V, formed of unique terms, is advantageously obtained S14 and subsequently relied upon S40-S54, instead of searching each terms of each vector as obtained for each authoritative entity. This way, a term frequency TF(w, $\alpha_i$) of a term w that is common to two or more authoritative entities $E_j$ is computed only once. In addition, steps S52 may be limited to a subset of terms w that are the most meaningful terms for a company, as discussed later.

Finally, present methods rank S70 a proximity of the identified data sources $S_i$ with each authoritative entity $E_j$ identified earlier, according to the term frequencies as determined S52-S54, S75-S76 for all the terms of the vector $v_j$ obtained for each of the authoritative entities.

This way, data sources, which may be anonymous (or pseudo-anonymous, see below), can be labeled with a certain degree of affinity to an authoritative source of data through an analysis of terms arising from such data sources. Such terms may come from any data or metadata associated to such sources. This above solution is neutral to the language used, inasmuch as said terms may be in any language.

An array as used herein is a data structure consisting of a collection of values, which, in the present context, are terms collected from the data sources. A one-dimensional array may be used for each data source. In variants, a multi-dimensional array may be relied upon, each dimension of which corresponds to a distinct source. This way, when iterating steps S21-S24 (see steps S25, S26) over each data source identified, only one array may need be further populated at each iteration, which present advantages in terms of data compression, inasmuch as many redundant terms may be used. An array as used here may be regarded as a table or a matrix (if a constant number of terms are used for each source). Yet, distinct numbers of terms may be selected for each source. Similarly, a vector is a one-dimensional data structure consisting of a collection of values (here terms).

The number of times a term occurs in a document is herein called "term frequency", by analogy with the concept of term frequency as used in the fields of in information retrieval and text mining, where the term frequency corresponds to the number of times a given term occurs in a given document. The same concept is used here, except it applies to an array of aggregated terms for one data source rather than a document. As discussed later in detail, an array of terms typically aggregates terms from several digital documents, messages, or, more generally, any file or datastream a source may be prompted to send, broadcast or store, e.g., in the context of social media.

The proximity as ranked by present methods may be regarded as a semantic proximity, inasmuch as several terms are compared to produce the desired result. However, no semantic analysis is strictly needed, although some kind of (light) analysis may be performed to discard common words (e.g., articles, conjunction, etc.) from the comparisons. Such an analysis may be performed a posteriori or a priori, in order to avoid to uselessly populate arrays and vectors.

The proximity ranking is performed according to the determined term frequencies. Several variants can be contemplated. In systematic approaches such as described below, the ranking is performed, with respect to a given entity, according to the term frequencies as determined for all of the terms w of the vector $v_j$ obtained for said given entity.

The several data sources identified S20 may include the authoritative sources themselves, in which case one may further want to distinguish authoritative sources from non-authoritative sources in the final ranking. To that aim, an additional ranking mechanism may be involved as discussed later in reference to FIG. 4.

All the present embodiments assume that data are legally collected, e.g., from data sources and entities which have agreed to share such data for the purpose of embodying the present methods. To that aim, aspects of the present invention may be implemented on anonymized data. In all cases, the present invention never aims at infringing any legal provision, be it privacy- or data protection-related, or not.

Some of the data sources will likely be anonymous (i.e., their name is not known or their relationships with the entities of interest in not known to the present methods) or pseudo-anonymous (the sources exhibit some relationships with the entities of interest but this cannot be simply verified).

The above approach may find applications in several fields, e.g., in social media as well as in security-related applications.

Figure 3:
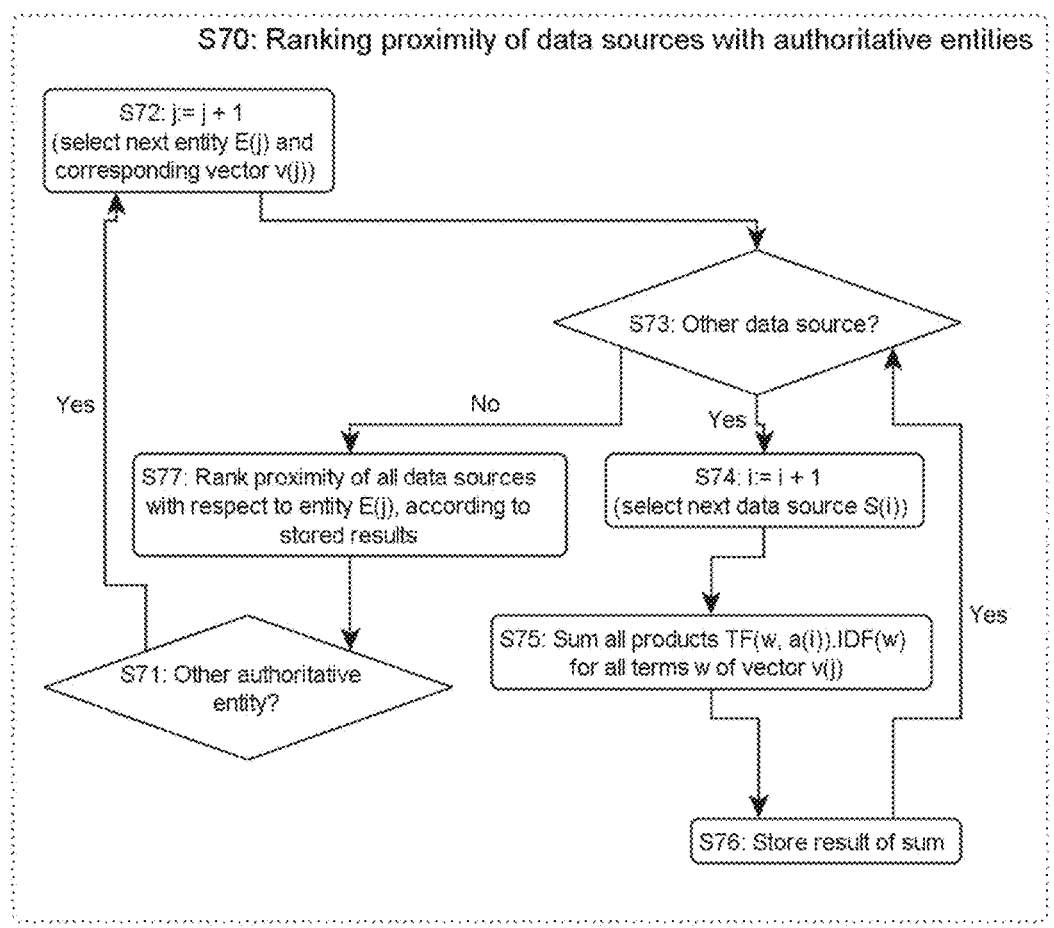
FIG. 3 is another flowchart illustrating high-level steps of a ranking method, according to embodiments.
Figure 4:
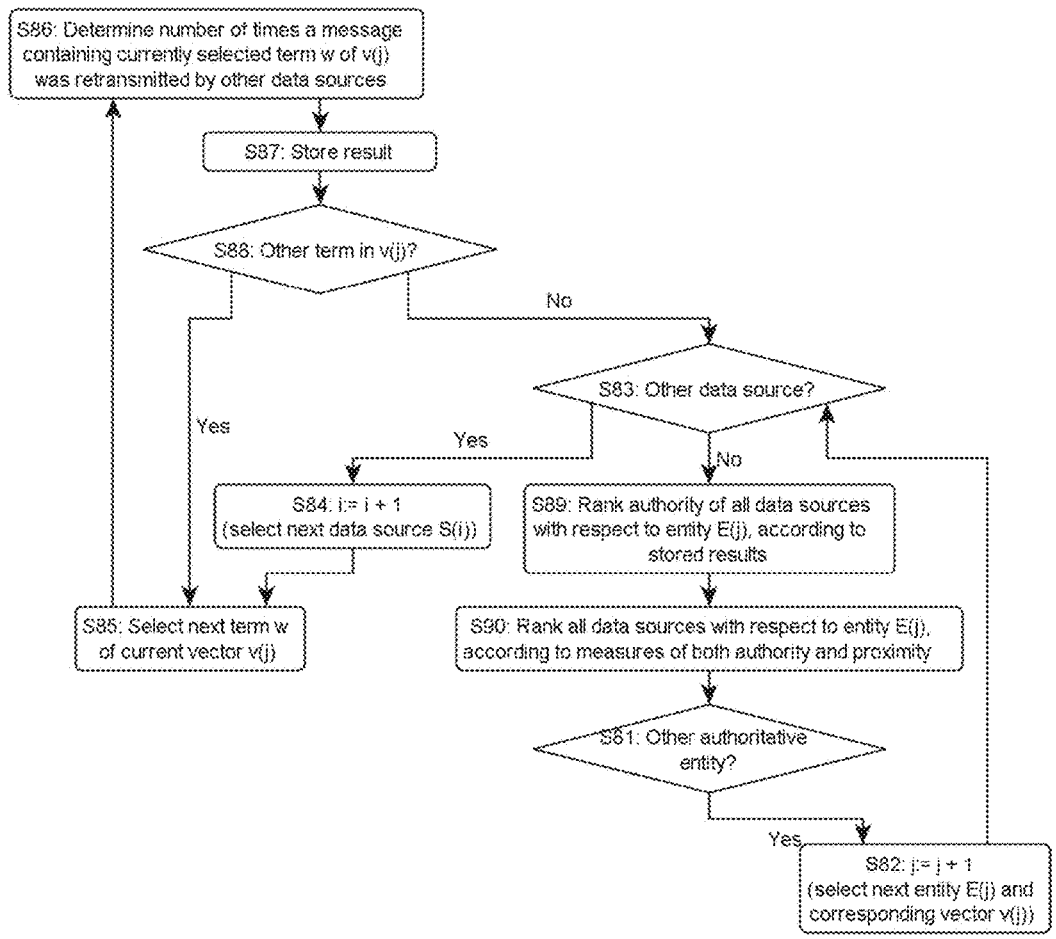
FIG. 4 is another flowchart illustrating high-level steps of a ranking method, according to embodiments.

Referring now to FIGS. 2-4, and in particular to FIG. 2, present methods may, in embodiments, further comprise a step of determining S44 a measure of information provided by terms in the vectors $v_j$, as previously obtained for the authoritative entities $E_j$. The function associated to this measure is noted IDF(w), for reason that will become apparent below. As further seen in FIG. 2, each term frequency TF(w, $\alpha_i$), as determined at step S52 may be subsequently weighted S54 by the measure IDF(w) as determined at step S44 for a same term w, to obtain S54 a weighted term frequency, noted TFIDF(w, $a_i$)=TF(w, $\alpha_i$). IDF(w), for this same term w. The function IDF(w) provides a measure of information associated to the term w, i.e., it indicates whether the term is common or rare across all arrays, which can pertinently be used to weight the term frequencies. Eventually, the ranking S70 can thus be performed according to the weighted term frequencies TFIDF (w, $\alpha_i$), as determined for all of the terms of the vector $v_j$ obtained for each authoritative entity.

Again, when determining S44 the measures IDF(w) of information provided by each term, not all the terms w of each of the vectors $v_j$ of each entity $E_j$ need be compared to terms in the arrays, owing to the likely overlap of terms in the vectors. Therefore, the same vector V of unique terms as determined at step S14 may once more be relied on, as assumed in the embodiment of FIG. 2. Accordingly, a measure IDF(w) of information provided by a term w that is common to two or more authoritative entities $E_j$ is computed only once.

In embodiments, said measure IDF(w) is determined S44 as a so-called "inverse document frequency", similar to the "inverse document frequency" as used in text mining. Namely, the function IDF(w) may be determined, for a given term w, based on the total number M of arrays (as determined for all of the data sources considered) and the number of arrays N(w) that actually comprise this given term w. However, the inverse document frequency used here is based on numbers of arrays, contrary to the IDF function as used in the fields of information retrieval and text mining, which considers documents. This distinction matters, inasmuch as an array likely aggregates terms from several documents of a same author, while it is not, per se, a document produced by this author. Thus, the function IDF used here may as well be referred to as an Inverse Array Frequency.

This function may notably be computed as IDF(w)=1+log(M/((1+N(w))), where the denominator 1+N(w) is chosen so as to avoid division by zero, as used in the examples disclosed herein. In variants, one may use IDF(w)=1+log(M/N(w)), provided that this alternate expression is only computed where the corresponding term frequency is not zero. Other expressions are known from the field of text mining, which can readily be used here, subject to the distinction noted above. The basis chosen for the log function is not critical, it just provides a constant multiplicative factor towards the final result.

In embodiments, the proximity ranking S70 is most simply performed according to a sum S75 of the weighted term frequencies, i.e., $\Sigma_w$TF(w $\alpha_i$), IDF(w) where the sum extends over all terms w of the vector $v_j$ associated to a given, authoritative entity, in respect of which one seeks to rank the sources $S_i$ corresponding to arrays $\alpha_i$ involved in the above expression, as illustrated in FIG. 3. If necessary, the sum S75 may be divided by the total number of terms of the vector $v_j$ to obtain the arithmetic mean. This may be useful if one wants to compare the rankings of a same data source with respect to various entities if the latter have associated vectors $v_j$ of different lengths (i.e., the numbers of terms differ for these entities).

In variants, the ranking S70 may performed according to a weighted sum of the weighted term frequencies, i.e., $\Sigma_w c_j(w)$ TF(w, $\alpha_i$) IDF(w), wherein each weighted term frequency TF(w, $\alpha_i$) IDF(w) is further weighted by a weight $c_j(w)$ attributed to each of the terms w of a vector $v_j$ associated to a given entity $E_j$. These additional weights $c_j$ may be specific to each entity $E_j$, e.g., to give more importance to certain terms, or to restrict the terms considered to a given subset, as noted earlier.

Turning now to additional details about the initial data acquisitions, referring back to FIG. 2, present methods may, in embodiments, further comprise steps of collecting S21 several documents (e.g., messages, e-mails, tweets) from each data source considered. This way, a first collection of documents is obtained, for each source. Then, one may identify S22, in said first collection, one or more non-original documents, i.e., documents that were originally produced by another data source. Thus, the non-original documents may be removed S22 from the first collection to obtain a second collection of documents. Accordingly, the subsequent selection S23 may be performed from the filtered collection of documents, to filter out the "noise" commonly encountered in social media.

In particular, documents identified S23 as documents retransmitted from another source may be discarded, starting with documents explicitly labelled as such. Retransmitted documents may further be identified S23, even when not explicitly flagged, by comparing hashes of documents, as discussed further in other parts of the present disclosure.

Terms relevant to authoritative entities may be extracted from web sites of these entities, or wikis. A small number of such terms generally suffice (e.g., imposing less than 10 terms may already be sufficient). In general, less than 100 terms suffice. Similarly, selecting less than 100 terms may already suffice for the data sources. Still, the more terms are used, the better the precision obtained in fine. The number of terms used can be filtered, in both cases. For example, the number of terms may be drastically reduced by selecting only the names of companies, or organizations.

As noted earlier, an additional ranking may prove useful, as discussed now in reference to FIG. 4. In embodiments, one may want to identify S89-S90, amongst the several data sources considered, those data sources that are authoritative data sources, i.e., sources affiliated with a given authoritative entity. As this information may not be explicitly or, even, determinable with absolute certainty from the sole information available to the present methods, an additional ranking may be useful. To that aim, one may rank S89 a measure of an "authority" of the several sources considered, i.e., according to a measure of authority obtained S87 for each data source with respect to a given authoritative entity.

One way of measuring the authority is to estimate the influence one source has onto others. To that aim, the additional ranking S89 may comprises determining S86, for each source $S_i$, a number of times that a document (e.g., a message, an e-mail, or a tweet) containing a term w of a vector $v_j$ as obtained for said given entity $E_j$ is retransmitted by another source $S_k$, k≠i. This is discussed in more detail herein.

Figure 5:
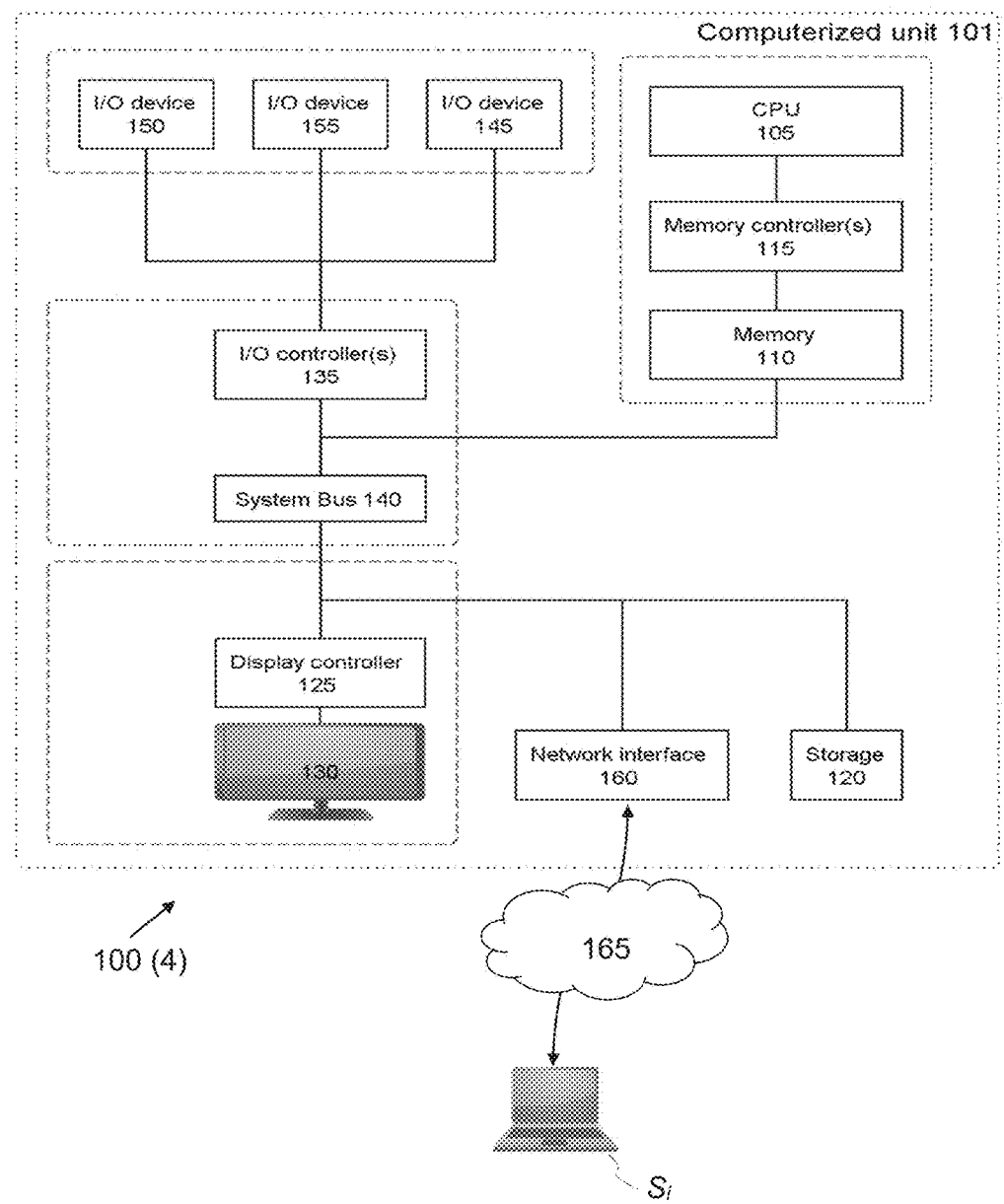
FIG. 5 schematically represents a general purpose computerized system, suited for implementing one or more method steps as involved in embodiments of the invention.

According to another aspect, embodiments of the invention can be embodied as a computerized system 100, as discussed now in reference to FIG. 5. This system 100 essentially comprises a memory 110, storing computerized methods and identifiers of several data sources and one or more authoritative entities, and one or more processing elements 105. The computerized methods are designed, when executed by said one or more processing elements, to perform steps as described above, i.e., to obtain S12 vectors $v_j$ of terms w representative of authoritative entities, to select S23 terms w from each data source and populate S24 arrays $\alpha_i$ accordingly, and determine S52 the needed term frequencies, to eventually rank S70 a proximity of the identified data sources $S_i$ with each authoritative entity $E_j$. Such a system may for instance form part or all of a server such as server 5 in FIG. 1.

The embodiments described above may find applications in various fields, including social networks. Namely, said data sources may be sources of data in a social network, e.g., be respectively associated to individual accounts in said social network. In such a case, the terms selected S23 may be terms from messages sent or broadcasted from said accounts. For example, FIG. 1 depicts various data sources $S_1$-$S_3$ acting from respective machines (laptops, smartphones, etc.) interacting in any suitable interconnected network 2 with one or more servers 5 (e.g., the latter hosting a social network), typically via additional systems 3, 4, e.g., storage systems, gateways, etc., to form an interconnected system 1. Beyond the simplistic configuration shown in FIG. 1, many possible configurations can be contemplated, as known per se. More details as to possible computerized systems that may be used to implement aspects of the present invention are given later in the present disclosure.

Embodiments of the invention can further be embodied as a computer-program product, as described in detail later in the present disclosure.

The above embodiments have been succinctly described in reference to the accompanying drawings and may accommodate a number of variants. Several combinations of the above features may be contemplated. Examples are given in the following paragraphs.

Assume a set of organizations or companies of interest and that these are worldwide customers of a large company and hence are in the order of hundreds of thousands. The set of organizations alter over time, as new customers emerge and existing ones disappear. Furthermore, assume that a significant sample of the entire set of data from the data sources is available, e.g., 10% of the total message stream of a given social network for the last three months. These customers may act as data sources for that company.

From the data sources, one may first extract S20 the entire set of pseudo-anonymous sources, e.g., a set of individual accounts. This set may contain every account of anyone that has sent a message contained in the sample considered. The number of such accounts may reach hundreds of millions. Next we require S12-S14 a set of representative terms for each company. By representative we mean that there are terms that we can expect a company to use in their data sources. The representative terms need not be very large, e.g., 100, and can either be manually created or generated from existing sources of information, e.g., by scrapping the web, looking at sales databases, etc. We assume that this set of representative terms will include the name (or names) of this company as, in general, companies typically allow their customers to transmit information about themselves. The terms are not restricted to one language, but are in the languages that the company uses, for example the languages found on their websites.

We combine S14 all such terms for all organizations, noting that there likely is a large overlap between terms, e.g., many IT companies might often use the word 'cloud'. This gives us a vector of a few millions of terms. We now take the identified S20 data sources and for each data source we combine S23-S24 all documents from each data source to produce S24 a single aggregated document per data source, i.e., an array. During this process we remove S22 any document for which the data source was not the original source. As data sources may replicate each other's message without explicitly indicating that they are doing so, this requires some care. First, we remove S22 those documents that are explicitly labeled as re-transmissions, e.g. re-tweets. Next we hash the documents using some cryptographic hash, e.g. SHA-1, and for all those documents which have the same hash, i.e., the same content, we preserve only the earliest labeled occurrence. The first appearance of the document and the data source can be considered its 'author', or the closest entity to the author.

In more sophisticated approach, several sub-sections of a same document may be hashed to allow finer grained comparisons with other (sub-sections of) documents.

Now, for all data sources we count S52 the number of occurrences (i.e., the term frequencies) of each terms in the vector V of unique terms. In addition, we create a total count S44 of all terms in the set of all aggregated documents, to weight the term frequencies, S54. As explained herein, this can be achieved using the product of term frequencies and inverse document frequencies, to amplify the score for words that are rather unusual in the corpus as a whole.

We consider the original representatives terms for each organization and calculate the term frequency inverse document frequency (TFIDF) score for each term. We finally combine S75 these values to give an overall score of the relationship of each anonymous source $S_i$ to one entity $E_j$ and rank them from the highest to lowest.

The simplest way of combining the TFIDF values is through the arithmetic mean, as discussed herein. Yet, if weights can be assigned to the terms, e.g., 'IBM' is more indicative of an IBM data source than the term 'Cloud', then a weighted mean might be more appropriate. Weights can also be automatically or manually generated.

Tables 1-5 below illustrate a process by which anonymous data sources are ranked by similitude to entities, according to embodiments. The number of terms is voluntarily reduced and the examples of messages simplified, for the sake of conciseness and understanding.

Table 1 below exemplifies possible representative terms for two entities, namely: IBM and a fictive entity called IT Apps. Inc. (any resemblance to an existing entity would be fortuitous), which produces and sells smartphones, laptops and media players.

TABLE 1

Example of representative terms for two entities (IBM and IT Apps. Inc.)

| Authoritative Entities | Representative Terms | | |
| --- | --- | --- | --- |
| IBM | IBM | Watson | Cloud |
| IT Apps. Inc. | IT Apps. Inc. | Smartphone | Laptop | Media Player |

A first vector $v_1$ may be obtained for IBM, which is $v_1$={IBM, Watson, Cloud}, while a second vector $v_2$ representing IT Apps Inc. may be taken as $v_2$={IT Apps. Inc., Smartphone, Laptop, Media Player}. From there, a set V of unique terms may be obtained, to discard duplicates, even if there is no overlap in the above example. This leads to V={IBM, Watson, Cloud, IT Apps. Inc., Smartphone, Laptop, Media Player}. Obviously, syntax variants may be taken into account.

Assume that the following accounts (and corresponding documents) are considered, as compiled in Table 2 below.

TABLE 2

Individual accounts and documents

| Account # | Document # | Document contents | Retransmission # |
|---|---|---|---|
| Account 1 | | | |
| | Document 1 | "IBM and Watson" | 1 |
| | Document 2 | "IBM and Cloud" | 1 |
| Account 2 | | | |
| | Document 1 (explicit retransmission) | "RT: IBM and Cloud" | 0 |
| | Document 2 | "Enjoy IT Apps. Inc." | 0 |
| Account 3 | | | |
| | Document 1 (implicit retransmission) | "IBM and Watson" | 0 |
| | Document 2 | "IBM and HAL" | 0 |
| Account 4 | | | |
| | Document 1 | "IT Apps. Inc. and Media Player" | 0 |
| Account 5 | | | |
| | Document 1 | "IBM and IT Apps. Inc." | 0 |

In the above example, the documents considered for each account (i.e., data source) are message broadcasted, e.g., tweets. Whereas the total number of documents is 8 (or 6, once having discarded the non-original documents), the total number of arrays (corresponding to each account) to consider for the computation of the IDF is M=5. As one may realize, in practice, considering arrays as done here instead of actual documents allows for massive computational simplification.

The arrays built for each account are shown in Table 3 below:

TABLE 3

Arrays as populated for each account (data source)

| Account # | Array # | Array contents |
|---|---|---|
| Account 1 | $a_1$ | {IBM, IBM, Watson, Cloud} |
| Account 2 | $a_2$ | {Enjoy, IT Apps. Inc.} |
| Account 3 | $a_3$ | {IBM, HAL} |
| Account 4 | $a_4$ | {IT Apps. Inc., Media Player} |
| Account 5 | $a_5$ | {IBM, IT Apps. Inc.} |

Table 4 below shows, for each representative term, the number N(w) of arrays where this term appears.

TABLE 4 number N(w) of arrays where the representative terms appear

| Representative terms | IBM | Watson | Cloud | IT Apps. | Smartphone | Laptop | Media Player |
|---|---|---|---|---|---|---|---|
| N(w) | 3 | 1 | 1 | 3 | 0 | 0 | 1 |

From there, one can compute the inverse document (or array) frequencies, as shown in Table 5 below (a base 10 is assumed for the log function).

TABLE 5

Inverse Document Frequencies for each representative terms. The final numbers are approximate numerical values.

| IBM | Watson | Cloud | IT Apps. Inc. | Smartphone | Laptop | Media Player |
|---|---|---|---|---|---|---|
| $1 + \log\left(\frac{5}{1+3}\right)$ $= 1.10$ | $1 + \log\left(\frac{5}{1+1}\right)$ $= 1.40$ | $1 + \log\left(\frac{5}{1+1}\right)$ $= 1.40$ | $1 + \log\left(\frac{5}{1+3}\right)$ $= 1.10$ | $1 + \log\left(\frac{5}{1+0}\right)$ $= 1.70$ | $1 + \log\left(\frac{5}{1+0}\right)$ $= 1.70$ | $1 + \log\left(\frac{5}{1+1}\right)$ $= 1.40$ |

Finally, both the time frequency inverse document frequencies (TFIDF) and the proximity ranking can be obtained, as illustrated in Table 6 below.

TABLE 6

Time frequency inverse document frequencies (TFIDF) and proximity ranking obtained for each account

| | Term Frequencies times Inverse Array Frequencies (TFIDF) | | | | | | | Proximity ranking | |
|---|---|---|---|---|---|---|---|---|---|
| Account # | IBM | Watson | Cloud | IT Apps. | Smartphone | Laptop | Media Player | IBM | IT Apps. |
| Account 1 | 2.19 | 1.40 | 1.40 | 0.00 | 0.00 | 0.00 | 0.00 | 4.99 | 0.00 |
| Account 2 | 0.00 | 0.00 | 0.00 | 1.10 | 0.00 | 0.00 | 0.00 | 0.00 | 1.10 |
| Account 3 | 1.10 | 0.00 | 0.00 | 0.00 | 0.00 | 0.00 | 0.00 | 1.10 | 0.00 |
| Account 4 | 0.00 | 0.00 | 0.00 | 1.10 | 0.00 | 0.00 | 1.40 | 0.00 | 2.49 |
| Account 5 | 1.10 | 0.00 | 0.00 | 1.10 | 0.00 | 0.00 | 0.00 | 1.10 | 1.10 |

It is important to understand what this ranking represents. It is a weighted measure of a given data source publishing information about organizations, which information is, to a certain extent, original information. With high probability the organization's own data sources will be in the top ranked ones, but non-authoritative data sources may also be highly ranked, in practice.

To account for authoritative information, we may create a distinct ranking to measure authority by including an additional factor that gives more value to authoritative data sources. This can be measured by counting not just the number of occurrences of terms, but in addition the number of times messages containing a given term were retransmitted by another, distinct data source. Now we can calculate the TFIDF score not of the terms themselves, but of the retransmitted terms, using the same technique as outlined previously, in reference to FIGS. 2-3. The process is the same as that shown in FIG. 2 and FIG. 3 except it is not be the number of representative terms that are present in the arrays that is counted, but the number of times a term is retransmitted by a distinct account. For instance, according to Table 2, last column, it can be concluded, with high probability, that the first data source (Account 1) is an authoritative source.

Thus, two ranks are obtained in fine, allowing to rate both the proximity and authority, which can be merged into a single ranking or kept distinct, as appropriate.

Sales systems make use of a wide range of data to help marketeers, analysts and sale representatives get a complete picture of their customers. It is of use to take advantage of social media within such systems and embodiments of the present invention provide a means of ranking the data sources according to their utility.

Computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., firmware), hardware, or a combination thereof. In exemplary embodiments, the methods described herein are implemented in software, as an executable program, the latter executed by suitable digital processing devices. More generally, embodiments of the present invention can be implemented wherein general-purpose digital computers, such as personal computers, workstations, etc., are used.

For instance, the system 100 depicted in FIG. 5 schematically represents a computerized unit 101, e.g., a general-purpose computer, which may be used in place of the server 5 of FIG. 1, or any entity in data communication therewith, so as to implement steps as described herein in reference to FIGS. 2-4. In exemplary embodiments, in terms of hardware architecture, as shown in FIG. 5, the unit 101 includes a processor 105, memory 110 coupled to a memory controller 115, and one or more input and/or output (I/O) devices 145, 150, 155 (or peripherals) that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly which stored in memory 110, and which may embody computerized methods to implement steps as described herein according to embodiments. The processor 105 can be any custom made or commercially available processor, a central processing unit (CPU), an auxiliary processor among several processors associated with the computer 101, a semiconductor based microprocessor (in the form of a microchip or chip set), or generally any device for executing software instructions.

The memory 110 can include any one or combination of volatile memory elements (e.g., random access memory) and nonvolatile memory elements. Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 5, the software in the memory 110 includes methods described herein in accordance with exemplary embodiments and a suitable operating system (OS) 111. The OS 111 essentially controls the execution of other computer programs and provides scheduling, input-output control, file and data management, memory management, and communication control and related services.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

Possibly, a conventional keyboard 150 and mouse 155 can be coupled to the input/output controller 135. Other I/O devices 145-155 may include other hardware devices.

In addition, the I/O devices 145-155 may further include devices that communicate both inputs and outputs. The system 100 can further include a display controller 125 coupled to a display 130. In exemplary embodiments, the system 100 can further include a network interface or transceiver 160 for coupling to a network 165, which may include or be in data communication with the network 2 of FIG. 1.

The network 165 transmits and receives data between the unit 101 and external systems. The network 165 is possibly implemented in a wireless fashion, e.g., using wireless protocols and technologies, such as WiFi, WiMax, etc. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 165 can also be an IP-based network for communication between the unit 101 and any external server, client and the like via a broadband connection. In exemplary embodiments, network 165 can be a managed IP network administered by a service provider. Besides, the network 165 can be a packet-switched network such as a LAN, WAN, Internet network, etc.

If the unit 101 is a PC, workstation, intelligent device or the like, the software in the memory 110 may further include a basic input output system (BIOS). The BIOS is stored in ROM so that the BIOS can be executed when the computer 101 is activated.

When the unit 101 is in operation, the processor 105 is configured to execute software stored within the memory 110, to communicate data to and from the memory 110, and to generally control operations of the computer 101 pursuant to the software. The methods described herein and the OS 111, in whole or in part are read by the processor 105, typically buffered within the processor 105, and then executed. When the methods described herein are implemented in software, the methods can be stored on any computer readable medium, such as storage 120, for use by or in connection with any computer related system or method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method for ranking a proximity of data sources with one or more reference entities, the method comprising:

identifying the data sources and the one or more reference entities;

for each identified reference entity, obtaining a vector of terms representative of said each reference entity;

determining a measure of information provided by the terms in the vector obtained for said each reference entity, wherein said measure of information is determined for each term w, by computing an inverse document frequency IDF as $IDF=1+\log(M/(1+N(w))$, where M is the total number of arrays as determined for all the identified data sources and N is the number of arrays that comprise said each term;

for each data source of the identified data sources, selecting terms from said each data source and populating an array comprising the selected terms;

determining, in said array, a term frequency of terms of the vector obtained for said each of the reference entities, wherein the term frequency corresponds to the number of occurrences of said each of the terms in said array;

weighting each term frequency, as determined for each data source, by the measure of information as determined for a term corresponding to a term for which said each term frequency was determined, to obtain a weighted term frequency for the term; and ranking a proximity of the identified data sources with each of the one or more reference entities, according to the weighted term frequencies as determined for all the terms of the vector obtained for said each reference entity.

2. The method of claim 1, wherein:
ranking is performed according to a sum of the weighted term frequencies determined for the terms of the vector obtained for said each of the reference entities.

3. The method of claim 2, wherein:
ranking is performed according to a weighted sum of the weighted term frequencies, wherein each weighted term frequency is further weighted by a weight attributed to each of the terms of the vector obtained for said each of the reference entities.

4. The method of claim 1, further comprising:
for each data source of the identified data sources, collecting several documents of said each data source to obtain a first collection of documents;
identifying in said first collection one or more non-original documents that were originally produced by another one of said data sources; and
removing the identified non-original documents from said first collection to obtain a second collection of documents, whereby terms subsequently selected for said each data source are selected from said second collection of documents.

5. The method of claim 4, wherein:
said one or more non-original documents are respectively identified as one or more documents retransmitted from said another one of the data sources.

6. The method of claim 4, wherein:
at least one of said one or more non-original documents is identified as an explicit retransmission from another one of the data sources.

7. The method of claim 4, wherein:
at least one of said one or more non-original documents is implicitly identified as a document retransmitted from another one of the data sources, by comparing hashes of documents.

8. The method of claim 1, wherein:
identifying one or more reference entities comprises identifying several reference entities;
determining a set of unique representative terms for all of the several reference entities; and
determining term frequencies in said array comprises determining a term frequency of terms of said set of unique representative terms.

9. The method of claim 1, wherein:
identifying one or more reference entities comprises identifying several reference entities;
determining a set of unique representative terms for all of the several reference entities; and
determining the measure of information comprises determining a measure of information as provided by terms in said set of unique representative terms.

10. The method of claim 1, further comprising:
for a given one of the reference entities, identifying, amongst the several data sources, those data sources that are authoritative data sources from said given one of the reference entities.

11. The method of claim 10, wherein
identifying authoritative data sources amongst the several data sources comprises ranking an authority of said several data sources according to a measure of an authority of each of said several data source with respect to said given one of the reference entities.

12. The method of claim 11, wherein:
ranking the authority of said several data sources comprises, for each of said several data sources, determining a number of times that a document containing a term of the vector obtained for said given one of the reference entities is retransmitted by another one of said several data sources.

13. The method of claim 1, wherein:
said data sources are sources of data in a social network.

14. The method of claim 13, wherein:
said data sources are respectively associated to individual accounts in said social network.

15. The method of claim 14, wherein:
selecting terms from said each data source comprises, for each of said individual accounts, selecting terms from messages sent or broadcasted from said accounts.

16. A computerized system for ranking a proximity of data sources with one or more reference entities, the system comprising:
a memory storing computerized methods and identifiers of the data sources and the one or more reference entities; and
one or more processing elements;
wherein the computerized methods are designed, when executed by said one or more processing elements, to:
obtain, for each identified reference entity, a vector of terms representative of said each reference entity;
determine a measure of information provided by the terms in the vector obtained for said each reference entity, wherein said measure of information is determined, for each term w, by computing an inverse document frequency IDF as $IDF=1+\log(M/(1+N(w))$, where M is the total number of arrays as determined for all the identified data sources and N is the number of arrays that comprise said each term;
for each data source of the identified data sources, select terms from said each data source and populate an array comprising the terms;
determine, in said array, a term frequency of terms of the vector obtained for said each of the reference entities, wherein the term frequency corresponds to the number of occurrences of said each of the terms in said array;
weight each term frequency, as determined for each data source, by the measure of information as determined for a term corresponding to a term for which said each term frequency was determined, to obtain a weighted term frequency for the term, and
rank a proximity of the identified data sources with each of the one or more reference entities, according to the weighted term frequencies as determined for all the terms of the vector obtained for said each reference entity.

17. A computer-program product for ranking a proximity of data sources with one or more reference entities, the computer program product comprising a non-transitory computer readable storage medium having program instructions embodied therewith, the program instructions being executable by one or more processing elements to cause the latter to:
identify the data sources and the one or more reference entities;
obtain, for each identified reference entity, a vector of terms representative of said each reference entity;
determine a measure of information provided by the terms in the vector obtained for said each reference entity, wherein said measure of information is determined, for each term w, by computing an inverse document frequency IDF as $IDF=1+\log(M/(1+N(w))$, where M is the total number of arrays as determined for all the identified data sources and N is the number of arrays that comprise said each term;
for each data source of the identified data sources, select terms from said each data source and populate an array comprising the selected terms;
determine, in said array, a term frequency of terms of the vector obtained for said each of the reference entities, wherein the term frequency corresponds to the number of occurrences of said each of the terms in said array;
weight each term frequency, as determined for each data source, by the measure of information as determined for a term corresponding to a term for which said each term frequency was determined, to obtain a weighted term frequency for the term;
rank a proximity of the identified data sources with each of the one or more reference entities, according to the weighted term frequencies as determined for all the terms of the vector obtained for said each reference entity.

* * * * *